United States Patent
Romano et al.

(10) Patent No.: US 7,511,606 B2
(45) Date of Patent: Mar. 31, 2009

(54) VEHICLE LOCATING UNIT WITH INPUT VOLTAGE PROTECTION

(75) Inventors: Frank Romano, Westborough, MA (US); Sampath Krishna, Winchester, MA (US); Son Nguyen, Marlborough, MA (US); Jesse Rhodes, Franklin, MA (US); Philip Grahame Crewe, Linton (GB); Daniel Jonathan Finchley Cletheroe, Great Shelford (GB); Mark Marsden, Saffron Walden (GB); Steven Walter Greendale, Cambridge (GB); Nigel James Watson, Whittlesford (GB); Ian Christopher Stroud, Newport (GB); Timothy David Howe, Great Shelford (GB); Gerard Edward Smith, Great Dunmow (GB); Colin Richard Smithers, Bishop's Stortford (GB)

(73) Assignee: LoJack Operating Company LP, Westwood, MA (US)

( * ) Notice: Subject to any disclaimer, the term of this patent is extended or adjusted under 35 U.S.C. 154(b) by 140 days.

(21) Appl. No.: 11/131,846

(22) Filed: May 18, 2005

(65) Prior Publication Data
US 2006/0261934 A1   Nov. 23, 2006

(51) Int. Cl.
*B60R 25/10* (2006.01)
(52) U.S. Cl. .................... 340/428; 340/933
(58) Field of Classification Search ................. 340/428, 340/426, 933, 988; 342/357.07, 357.09, 342/357.04; 327/310
See application file for complete search history.

(56) References Cited

U.S. PATENT DOCUMENTS

| | | | |
|---|---|---|---|
| 3,851,121 | A | 11/1974 | Marvin |
| 3,855,416 | A | 12/1974 | Fuller |
| 3,855,418 | A | 12/1974 | Fuller |
| 3,971,034 | A | 7/1976 | Bell, Jr. et al. |
| 4,093,821 | A | 6/1978 | Williamson |
| 4,142,067 | A | 2/1979 | Williamson |
| 4,177,466 | A | 12/1979 | Reagan |
| 4,377,158 | A | 3/1983 | Friedman et al. |

(Continued)

FOREIGN PATENT DOCUMENTS

EP   0 862 304 A2   9/1998

(Continued)

OTHER PUBLICATIONS

Abstract: Couretas, John, Automotive News, "Car Dealer Management Software Systems are Being Re-Engineered with Web Technology to Allow Greater Communications with Customers," Published in the United States, Nov. 1999, vol. 5847, 3 pages.

(Continued)

*Primary Examiner*—Daniel Wu
*Assistant Examiner*—Shirley Lu
(74) *Attorney, Agent, or Firm*—Iandiorio Teska & Coleman (57) ABSTRACT

A vehicle locating unit with a receiver for receiving a signal from a network of communication sources, a transponder activated when a communication source sends a message to the receiver, and a power supply regulating circuit for regulating a nominal input voltage and powering the receiver and the transponder. A protection circuit is responsive to an injected input voltage and configured to clamp the injected (high level) input voltage at a predetermined maximum voltage.

5 Claims, 6 Drawing Sheets

U.S. PATENT DOCUMENTS

| | | | |
|---|---|---|---|
| 4,490,840 A | 12/1984 | Jones | |
| 4,694,483 A | 9/1987 | Cheung | |
| 4,818,988 A | 4/1989 | Cooperman et al. | |
| 4,908,609 A | 3/1990 | Stroomer | |
| 5,148,483 A | 9/1992 | Silverman | |
| 5,148,493 A | 9/1992 | Bruney | |
| 5,206,903 A | 4/1993 | Kohler et al. | |
| 5,239,460 A | 8/1993 | LaRoche | |
| 5,299,260 A | 3/1994 | Shaio | |
| 5,391,948 A * | 2/1995 | Izumita | 327/310 |
| 5,467,391 A | 11/1995 | Donaghue et al. | |
| 5,500,795 A | 3/1996 | Powers et al. | |
| 5,535,256 A | 7/1996 | Maloney et al. | |
| 5,559,875 A | 9/1996 | Bieselin et al. | |
| 5,561,707 A | 10/1996 | Katz | |
| 5,590,171 A | 12/1996 | Howe et al. | |
| 5,590,188 A | 12/1996 | Crockett | |
| 5,594,790 A | 1/1997 | Curren et al. | |
| 5,594,791 A | 1/1997 | Szlam et al. | |
| 5,621,789 A | 4/1997 | McCalmont et al. | |
| 5,633,916 A | 5/1997 | Goldhagen et al. | |
| 5,646,981 A | 7/1997 | Klein | |
| 5,696,811 A | 12/1997 | Maloney et al. | |
| 5,704,008 A | 12/1997 | Duvall, Jr. | |
| 5,710,884 A | 1/1998 | Dedrick | |
| 5,712,954 A | 1/1998 | Dezonno | |
| 5,717,742 A | 2/1998 | Hyde-Thomson | |
| 5,721,827 A | 2/1998 | Logan et al. | |
| 5,724,420 A | 3/1998 | Torgrim | |
| 5,732,216 A | 3/1998 | Logan et al. | |
| 5,734,890 A | 3/1998 | Case et al. | |
| 5,737,405 A | 4/1998 | Dezonno | |
| 5,757,904 A | 5/1998 | Anderson | |
| 5,764,728 A | 6/1998 | Ala et al. | |
| 5,768,513 A | 6/1998 | Kuthyar et al. | |
| 5,784,452 A | 7/1998 | Carney | |
| 5,790,798 A | 8/1998 | Beckett, II et al. | |
| 5,799,063 A | 8/1998 | Krane | |
| 5,815,551 A | 9/1998 | Katz | |
| 5,818,907 A | 10/1998 | Maloney et al. | |
| 5,818,909 A | 10/1998 | Van Berkum et al. | |
| 5,822,306 A | 10/1998 | Catchpole | |
| 5,822,400 A | 10/1998 | Smith | |
| 5,822,410 A | 10/1998 | McCausland et al. | |
| 5,822,744 A | 10/1998 | Kesel | |
| 5,825,869 A | 10/1998 | Brooks et al. | |
| 5,828,730 A | 10/1998 | Zebryk et al. | |
| 5,841,966 A | 11/1998 | Irribarren | |
| 5,845,290 A | 12/1998 | Yoshii | |
| 5,848,396 A | 12/1998 | Gerace | |
| 5,854,832 A | 12/1998 | Dezonno | |
| 5,857,175 A | 1/1999 | Day et al. | |
| 5,859,898 A | 1/1999 | Checco | |
| 5,864,616 A | 1/1999 | Hartmeier | |
| 5,870,549 A | 2/1999 | Bobo, II | |
| 5,875,436 A | 2/1999 | Kikinis | |
| 5,884,032 A | 3/1999 | Bateman et al. | |
| 5,884,262 A | 3/1999 | Wise et al. | |
| 5,894,512 A | 4/1999 | Zenner | |
| 5,897,616 A | 4/1999 | Kanevsky et al. | |
| 5,903,641 A | 5/1999 | Tonisson | |
| 5,910,107 A | 6/1999 | Iliff | |
| 5,911,776 A | 6/1999 | Guck | |
| 5,914,951 A | 6/1999 | Bentley et al. | |
| 5,915,001 A | 6/1999 | Uppaluru | |
| 5,915,011 A | 6/1999 | Miloslavsky | |
| 5,917,423 A | 6/1999 | Duvall | |
| 5,923,746 A | 7/1999 | Baker | |
| 5,926,538 A | 7/1999 | Deryugin | |
| 5,930,764 A | 7/1999 | Melchione et al. | |
| 5,940,476 A | 8/1999 | Morgenstein et al. | |
| 5,940,494 A | 8/1999 | Rafacz | |
| 5,940,792 A | 8/1999 | Hollier | |
| 5,943,416 A | 8/1999 | Gisby | |
| 5,945,989 A | 8/1999 | Freishtat | |
| 5,946,375 A | 8/1999 | Pattison et al. | |
| 5,946,388 A | 8/1999 | Walker et al. | |
| 5,953,389 A | 9/1999 | Pruett | |
| 5,953,406 A | 9/1999 | LaRue et al. | |
| 5,978,465 A | 11/1999 | Corduroy et al. | |
| 5,987,415 A | 11/1999 | Breese et al. | |
| 5,991,735 A | 11/1999 | Gerace | |
| 6,003,013 A | 12/1999 | Boushy et al. | |
| 6,006,188 A | 12/1999 | Bogdashevsky et al. | |
| 6,009,163 A | 12/1999 | Nabkel et al. | |
| 6,014,647 A | 1/2000 | Nizzari et al. | |
| 6,021,428 A | 2/2000 | Miloslavsky | |
| 6,029,153 A | 2/2000 | Bauchner et al. | |
| 6,058,163 A | 5/2000 | Pattison et al. | |
| 6,064,731 A | 5/2000 | Flockhart et al. | |
| 6,078,891 A | 6/2000 | Riordan | |
| 6,108,711 A | 8/2000 | Beck et al. | |
| 6,128,380 A | 10/2000 | Shaffer et al. | |
| 6,151,571 A | 11/2000 | Pertrushin | |
| 6,173,053 B1 | 1/2001 | Bogart et al. | |
| 6,185,534 B1 | 2/2001 | Breese et al. | |
| 6,195,426 B1 | 2/2001 | Bolduc et al. | |
| 6,205,215 B1 | 3/2001 | Dombakly | |
| 6,211,818 B1 * | 4/2001 | Zach, Sr. | 342/357.07 |
| 6,212,502 B1 | 4/2001 | Ball et al. | |
| 6,229,988 B1 | 5/2001 | Stapefeld et al. | |
| 6,243,684 B1 | 6/2001 | Stuart et al. | |
| 6,275,806 B1 | 8/2001 | Pertrushin | |
| 6,289,094 B1 | 9/2001 | Miloslavsky | |
| 6,295,353 B1 | 9/2001 | Flockhart et al. | |
| 6,334,110 B1 | 12/2001 | Walter et al. | |
| 6,345,094 B1 | 2/2002 | Khan et al. | |
| 6,353,810 B1 | 3/2002 | Petrushin | |
| 6,363,145 B1 | 3/2002 | Shaffer et al. | |
| 6,366,658 B1 | 4/2002 | Bjornberg et al. | |
| 6,366,666 B2 | 4/2002 | Bengtson | |
| 6,389,132 B1 | 5/2002 | Price | |
| 6,392,666 B1 | 5/2002 | Hong et al. | |
| 6,404,883 B1 | 6/2002 | Hartmeier | |
| 6,411,687 B1 | 6/2002 | Bohacek et al. | |
| 6,411,708 B1 | 6/2002 | Khan | |
| 6,424,709 B1 | 7/2002 | Doyle et al. | |
| 6,434,230 B1 | 8/2002 | Gabriel | |
| 6,434,231 B2 | 8/2002 | Neyman et al. | |
| 6,466,663 B1 | 10/2002 | Ravenscroft et al. | |
| 6,480,601 B1 | 11/2002 | McLaughlin | |
| 6,480,826 B2 | 11/2002 | Petrushin | |
| 6,490,560 B1 | 12/2002 | Ramaswamy et al. | |
| 6,510,220 B1 | 1/2003 | Beckett et al. | |
| 6,522,698 B1 | 2/2003 | Irving et al. | |
| 6,535,601 B1 | 3/2003 | Flockhart et al. | |
| 6,542,156 B1 | 4/2003 | Hong et al. | |
| 6,553,112 B2 | 4/2003 | Ishikawa | |
| 6,556,976 B1 | 4/2003 | Callen | |
| 6,567,504 B1 | 5/2003 | Kercheval et al. | |
| 6,567,787 B1 | 5/2003 | Walker et al. | |
| 6,574,605 B1 | 6/2003 | Sanders et al. | |
| 6,598,020 B1 | 7/2003 | Kleindienst et al. | |
| 6,600,821 B1 | 7/2003 | Chan et al. | |
| 6,601,031 B1 | 7/2003 | O'Brien | |
| 6,611,498 B1 | 8/2003 | Baker et al. | |
| 6,628,777 B1 | 9/2003 | McIllwaine et al. | |
| 6,643,622 B2 | 11/2003 | Stuart et al. | |
| 6,647,372 B1 | 11/2003 | Brady et al. | |
| 6,658,388 B1 | 12/2003 | Kleindienst et al. | |
| 6,658,391 B1 | 12/2003 | Williams et al. | |
| 6,662,156 B2 | 12/2003 | Bartosik | |
| 6,665,613 B2 | 12/2003 | Duvall | |
| 6,665,644 B1 | 12/2003 | Kanevsky et al. | |

| | | |
|---|---|---|
| 6,700,972 B1 | 3/2004 | McGugh et al. |
| 6,721,417 B2 | 4/2004 | Saito et al. |
| 6,721,704 B1 | 4/2004 | Strubbe et al. |
| 6,724,887 B1 | 4/2004 | Eilbacher et al. |
| 6,731,307 B1 | 5/2004 | Strubbe et al. |
| 6,731,744 B1 | 5/2004 | Khuc et al. |
| 6,735,298 B2 | 5/2004 | Neyman et al. |
| 6,741,697 B2 | 5/2004 | Benson et al. |
| 6,744,877 B1 | 6/2004 | Edwards |
| 6,760,414 B1 | 7/2004 | Schurko et al. |
| 6,760,727 B1 | 7/2004 | Schroeder et al. |
| 6,766,012 B1 | 7/2004 | Crossley |
| 6,788,768 B1 | 9/2004 | Saylor et al. |
| 6,798,876 B1 | 9/2004 | Bala |
| 6,839,671 B2 | 1/2005 | Attwater et al. |
| 6,853,966 B2 | 2/2005 | Bushey et al. |
| 6,868,392 B1 | 3/2005 | Ogasawara |
| 2002/0002460 A1 | 1/2002 | Perturshin |
| 2002/0002464 A1 | 1/2002 | Perturshin |
| 2002/0010587 A1 | 1/2002 | Perturshin |
| 2002/0111811 A1 | 8/2002 | Bares et al. |
| 2002/0133394 A1 | 9/2002 | Bushey et al. |
| 2002/0194002 A1 | 12/2002 | Petrushin |
| 2003/0033145 A1 | 2/2003 | Petrushin |
| 2003/0033152 A1 | 2/2003 | Cameron |
| 2003/0069780 A1 | 4/2003 | Hailwood et al. |
| 2003/0072463 A1 | 4/2003 | Chen |
| 2003/0154092 A1 | 8/2003 | Bouron et al. |
| 2004/0073569 A1 | 4/2004 | Knott et al. |
| 2004/0101127 A1 | 5/2004 | Dezonno et al. |
| 2004/0117185 A1 | 6/2004 | Scarano et al. |
| 2004/0162724 A1 | 8/2004 | Hill et al. |
| 2004/0181376 A1 | 9/2004 | Fables et al. |
| 2004/0190687 A1 | 9/2004 | Baker |
| 2004/0249636 A1 | 12/2004 | Applebaum |
| 2004/0249650 A1 | 12/2004 | Freedman et al. |
| 2004/0264652 A1 | 12/2004 | Erhart et al. |
| 2005/0010411 A1 | 1/2005 | Rigazio et al. |
| 2005/0010415 A1 | 1/2005 | Hagen et al. |
| 2005/0108775 A1 | 5/2005 | Bachar et al. |
| 2005/0123115 A1 | 6/2005 | Gritzer et al. |

FOREIGN PATENT DOCUMENTS

| | | |
|---|---|---|
| EP | 0 863 678 A2 | 9/1998 |
| EP | 0 998 108 A1 | 5/2000 |
| GB | 2 331 201 A | 5/1999 |

OTHER PUBLICATIONS

Abstract: Retail Banker International, "Efficiency Radio (ER), is Increasingly Being Looked to by Bankers, Analysts as a Yardstick of Operating Success, in Era of Permanent Downsizing and Cost Reduction," vol. 341, Published in Ireland; Jan. 1996, 2 pages.

Abstract: Call Center Magazine, The Most Innovative Call Center Products We Saw in 1999, vol. 13, No. 2, 1 page.

Abstract: Kohli, Rajiv et al., Journal of System Management, "Strategic Application of Organization Data Through Customer Relational Databases," vol. 44, No. 10, Oct. 1993, 1 page.

Abstract: Sullivan, Kristina B., PC Week, Product Announcement, "Software Helps Salespeople Generate New Leads," vol. 3, No. 38, Sep. 1986, 1 page.

Abstract: Garrison, P., Computing for Business, "An Electric Sales Call File," vol. 9, No. 4, Sep. 1984, 1 page.

Abstract: Killenbrew, Wayne et al., Telephony, "Playing by the Rules," vol. 235, No. 25, Dec. 1998, 1 page.

Abstract: Testa, Bridget Mintz, Telecommunications Americas, "Call Monitoring Gets Emotional," vol. 38, No. 13, Dec. 2004, 1 page.

Abstract: Tan, Run-Hua et al., Journal of Hebei University of Technology, "Innovation Design of Product Based on TRIZ," vol. 33, No. 2, 2004.

Abstract: Newswire, "etalk and Utopy to Provide Enhanced Quality Monitoring and Speech Analytics Solutions to Contact Centers," Apr. 2003.

* cited by examiner

VEHICLE LOCATING UNIT WITH INPUT VOLTAGE PROTECTION

FIELD OF THE INVENTION

This invention relates to stolen vehicle recovery systems and in particular to a vehicle locating unit with input voltage protection.

BACKGROUND OF THE INVENTION

The applicant's successful and popular vehicle recovery system sold under the trademark LoJack® includes a small electronic vehicle locating unit (VLU) with a transponder hidden within a vehicle, a private network of communication towers each with a remote transmitting unit (RTU), one or more law enforcement vehicles equipped with a vehicle tracking unit (VTU), and a network center with a database of customers who have purchased a VLU. The network center interfaces with the National Criminal Information Center. The entries of that database comprise the VIN number of the customer's vehicle and an identification code assigned to the customer's VLU.

When a LoJack® product customer reports that her vehicle has been stolen, the VIN number of the vehicle is reported to a law enforcement center for entry into a database of stolen vehicles. The network center includes software that interfaces with the database of the law enforcement center to compare the VIN number of the stolen vehicle with the database of the network center which includes VIN numbers corresponding to VLU identification codes. When there is a match between a VIN number of a stolen vehicle and a VLU identification code, as would be the case when the stolen vehicle is equipped with a VLU, and when the center has acknowledged the vehicle has been stolen, the network center communicates with the RTUs of the various communication towers (currently there are 130 nationwide) and each tower transmits a message to activate the transponder of the particular VLU bearing the identification code.

The transponder of the VLU in the stolen vehicle is thus activated and begins transmitting the unique VLU identification code. The VTU of any law enforcement vehicles proximate the stolen vehicle receive this VLU transponder code and, based on signal strength and directional information, the appropriate law enforcement vehicle can take active steps to recover the stolen vehicle. See, for example, U.S. Pat. Nos. 4,177,466; 4,818,988; 4,908,609; 5,704,008; 5,917,423; 6,229,988; 6,522,698; and 6,665,613 all incorporated herein by this reference.

A typical VLU includes, inter alia, a receiver or a receiver and a transmitter combined as a transceiver, a transponder, and a microcontroller programmed to, among other things, control the operation of the transceiver and transponder to process messages received by the transceiver and to store the unique identification number of the VLU. A VLU power supply unit receives a nominal 12 volt signal from the vehicle and filters and regulates that input voltage to provide the appropriate voltage levels for the operation of the transceiver, the transponder, and the microcontroller.

When a vehicle is stolen, it is possible to disable the VLU by injecting into it a very high (e.g., 200 volt) input voltage. When subjected to such an input voltage, the power supply unit, the transceiver, the transponder, and/or the microcontroller (or individual components thereof) can be damaged rendering the VLU inoperable and unable to transmit the transponder signal.

SUMMARY OF THE INVENTION

It is therefore an object of this invention to provide a vehicle locating unit for a stolen vehicle recovery system which is not damaged if a high input voltage is injected into the vehicle locating unit.

The subject invention results from the realization that by adding a protection circuit to the power supply regulating circuit of the vehicle locating unit which clamps the input voltage at a predetermined maximum voltage, attempts to disable the vehicle locating unit by injecting a high input voltage into the vehicle locating unit will fail.

The subject invention, however, in other embodiments, need not achieve all these objectives and the claims hereof should not be limited to structures or methods capable of achieving these objectives.

The subject invention features a vehicle locating unit with a receiver for receiving a signal from a network of communication sources, a transponder activated when a communication source sends a message to the receiver, and a power supply regulating circuit for regulating a nominal input voltage and powering the receiver and the transponder. A protection circuit is responsive to an injected (high level) input voltage and configured to clamp the injected input voltage at a predetermined maximum voltage.

Typically, every component of the protection circuit is selected to withstand an injected input voltage greater than said nominal input voltage. In one preferred embodiment, the protection circuit includes a voltage limiting diode which clamps the injected input voltage at the predetermined maximum voltage.

In one example, the protection circuit is integrated with the power supply regulating circuit. For example, one typically power supply regulating circuit includes a filtering circuit connected to the input voltage and a first stage voltage regulating circuit connected to the filtering circuit. The protection circuit is integral with the filtering circuit and the first stage voltage regulating circuit and every component of the filtering circuit is selected to withstand, without damage, an injected input voltage greater than said nominal input voltage. In this embodiment, it is the first stage voltage regulating circuit which includes a voltage limiting diode to clamp the output of the filtering circuit to the predetermined maximum. A second stage voltage regulating circuit is connected to the first stage voltage regulating circuit and is configured to provide the appropriate voltage levels to the receiver and transponder.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
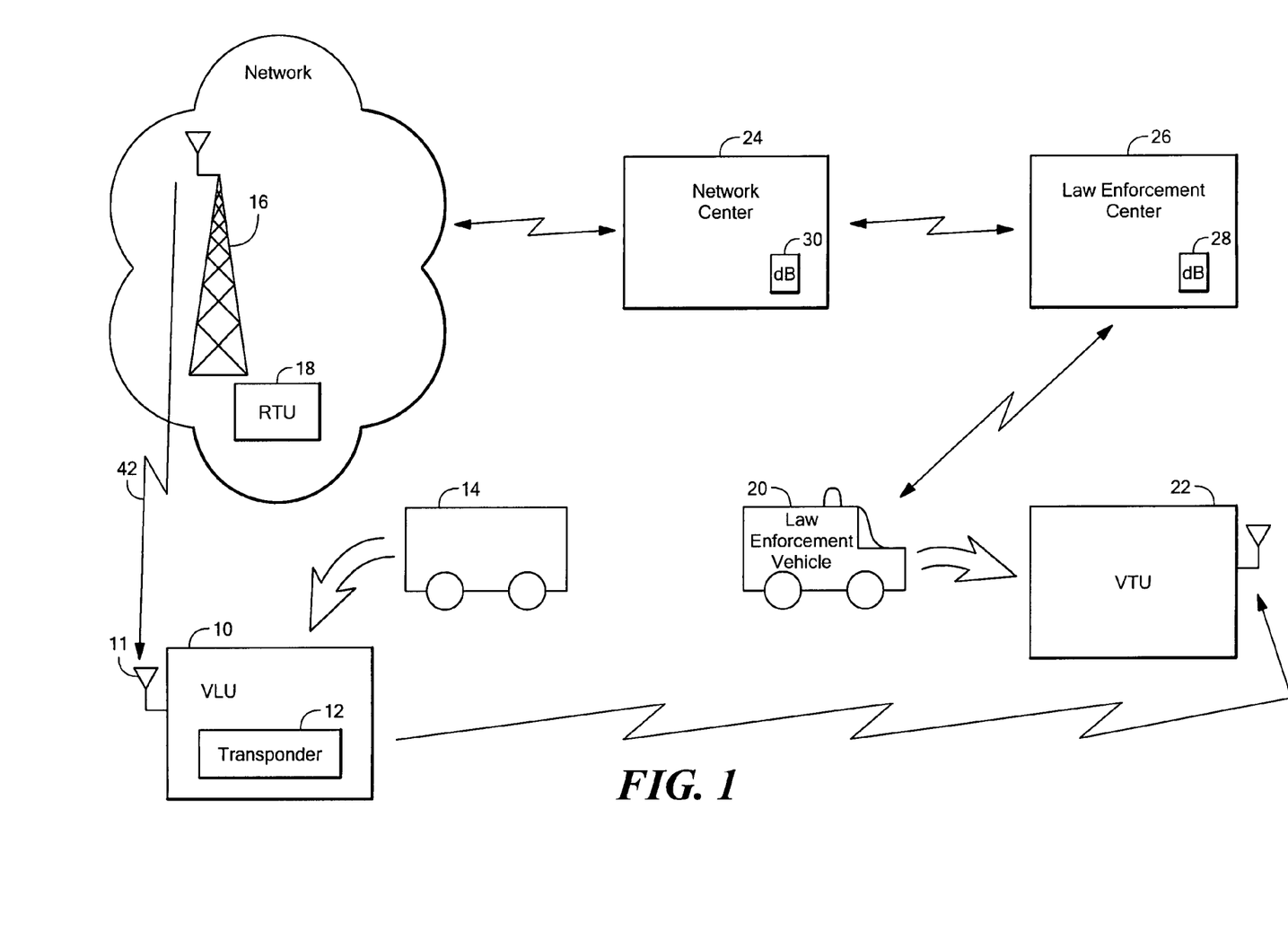
FIG. 1 is a block diagram depicting the primary components associated with one example of stolen vehicle recovery system in accordance with the subject invention.

As discussed in the background section above, the applicant's successful and popular vehicle recovery system sold under the trademark LoJack® includes a small electronic vehicle locating unit (VLU) 10, FIG. 1 with a transponder 12 hidden within a vehicle 14, a private network of communication towers 16 each with a remote transmitting unit (RTU) 18, one or more law enforcement vehicles 20 equipped with a vehicle tracking unit (VTU) 22, and network center 24.

When a LoJack® product customer reports that her vehicle has been stolen, the VIN number of the vehicle is reported to law enforcement center 26 for entry into database 28 of stolen vehicles. Network center 24 includes software that interfaces with database 28 of law enforcement center 26 to compare the VIN number of the stolen vehicle with database 30 of network center 24 which includes VIN numbers corresponding to VLU identification codes. When there is a match between a VIN number of a stolen vehicle and a VLU identification code, as would be the case when stolen vehicle 14 is equipped with VLU 10, network center 24 communicates with the RTUs 18 of the various communication towers 16 and each tower transmits a message to activate transponder 12 of VLU 10 bearing the particular identification code.

Transponder 12 of VLU 10 in stolen vehicle 14, once activated, begins transmitting a unique VLU identification code. VTU 22 of law enforcement vehicle 20 proximate stolen vehicle 14 receives this VLU transponder code and, based on signal strength and directional information, the appropriate law enforcement vehicle can take active steps to recover stolen vehicle 14.

Figure 2:
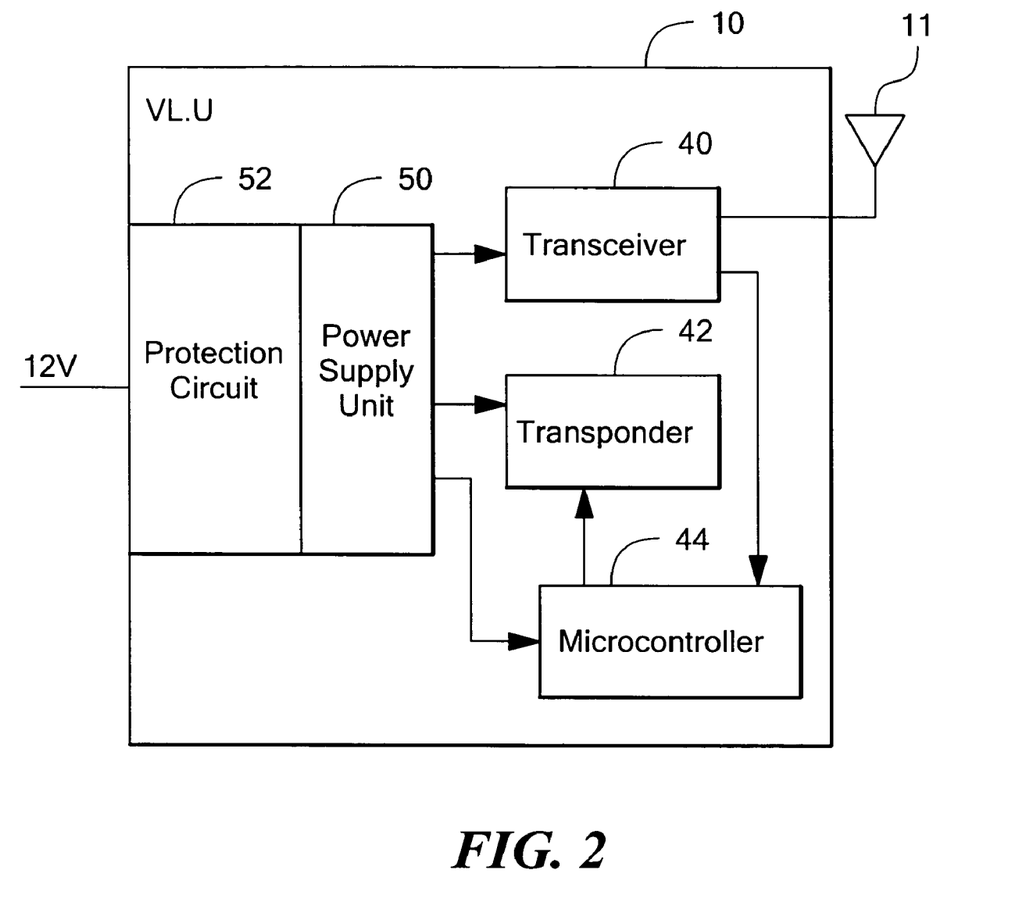
FIG. 2 is a block diagram showing the primary components associated with an embodiment of a vehicle locating unit in accordance with the subject invention.

Vehicle locating unit or VLU 10, FIG. 2 includes, inter alia, a receiver or a receiver and a transmitter combined in transceiver 40, transponder 42, and microcontroller 44 programmed to control the operation of transceiver 40 and transponder 42, to process messages received by transceiver 40, and to store the unique identification number of the VLU.

VLU power supply unit 50 receives a nominal 12 volt signal from vehicle 14, FIG. 1 and filters and regulates that nominal input voltage to provide the appropriate voltage levels for the operation of transceiver 40, FIG. 2, transponder 42, and microcontroller 44.

Transceiver 40 receives via antenna 11, FIGS. 1 and 2 signals from towers 16 of the network. When vehicle 14 is reported stolen by law enforcement center 26, network center 24 signals RTU 18 of tower 16 (and all the towers in the network) to present a message to transceiver 40, FIG. 2. This message is processed by controller 44 which then activates transponder 42 accordingly.

When a vehicle is stolen, it is possible to disable a prior art VLU by injecting a high (e.g., 200 volt) input voltage into the VLU. When subjected to such an input voltage, the power supply unit, the transceiver, the transponder, and/or the microcontroller (or individual components thereof) can be damaged rendering the VLU inoperable.

But not in accordance with the subject invention due to the addition of protection circuit 52 configured to clamp the input voltage to VLU 10 at a predetermined maximum.

Figure 3:
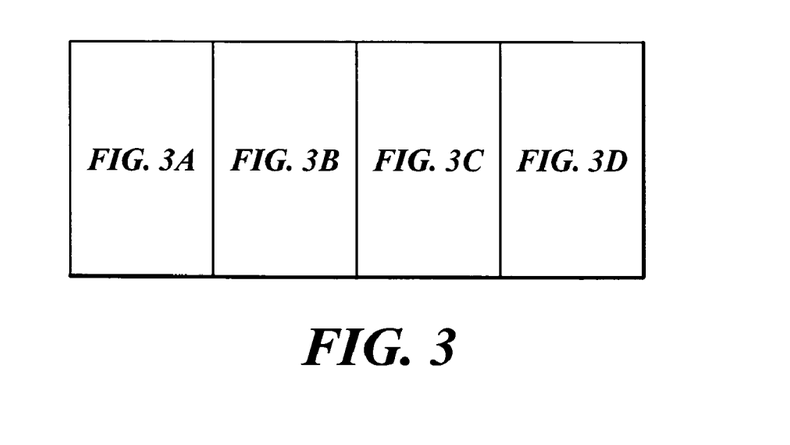
FIG. 3 is a circuit diagram showing the protection circuit for the power supply unit for the vehicle locating unit shown in FIG. 2.
Figure 3A:
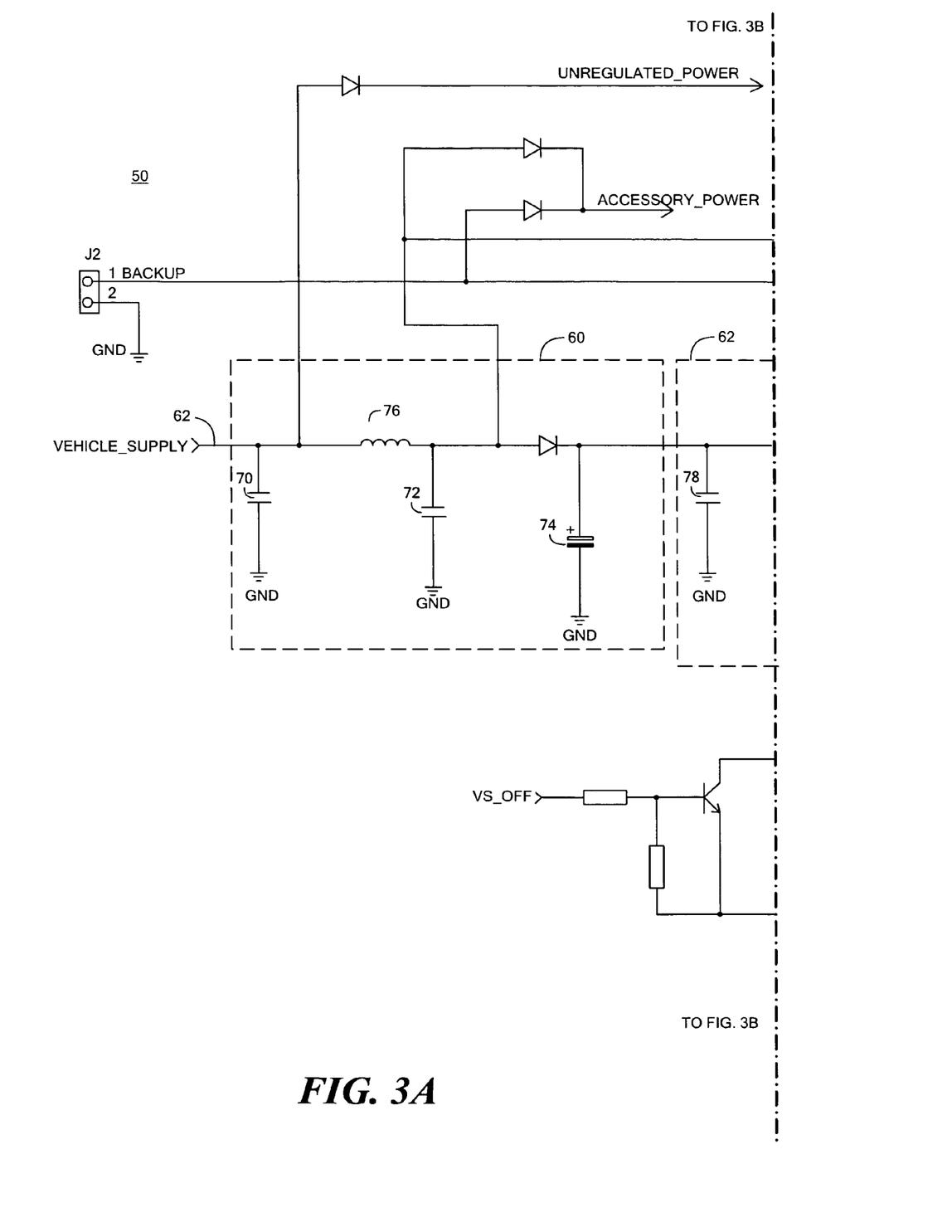
Figure 3B:
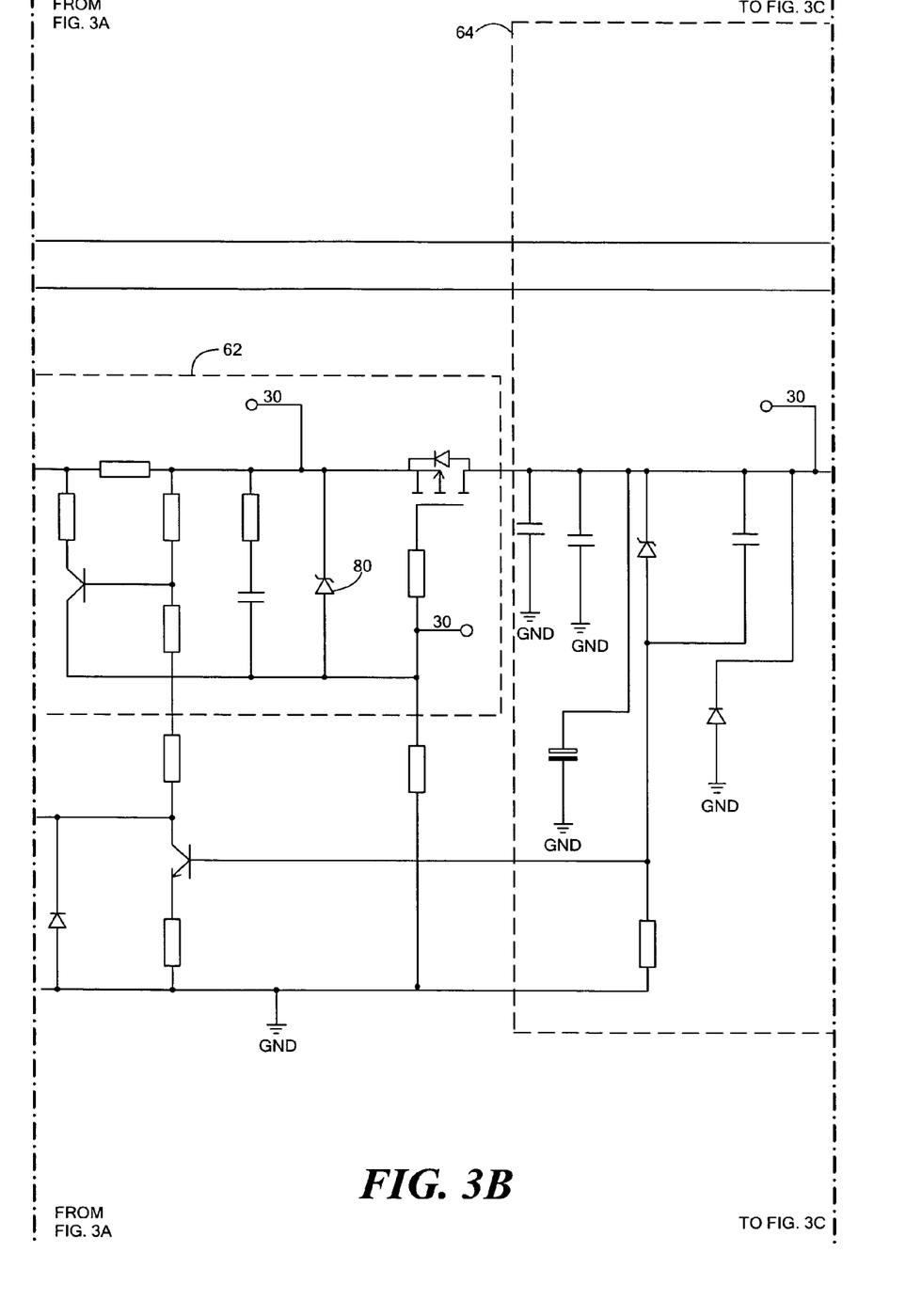
Figure 3C:
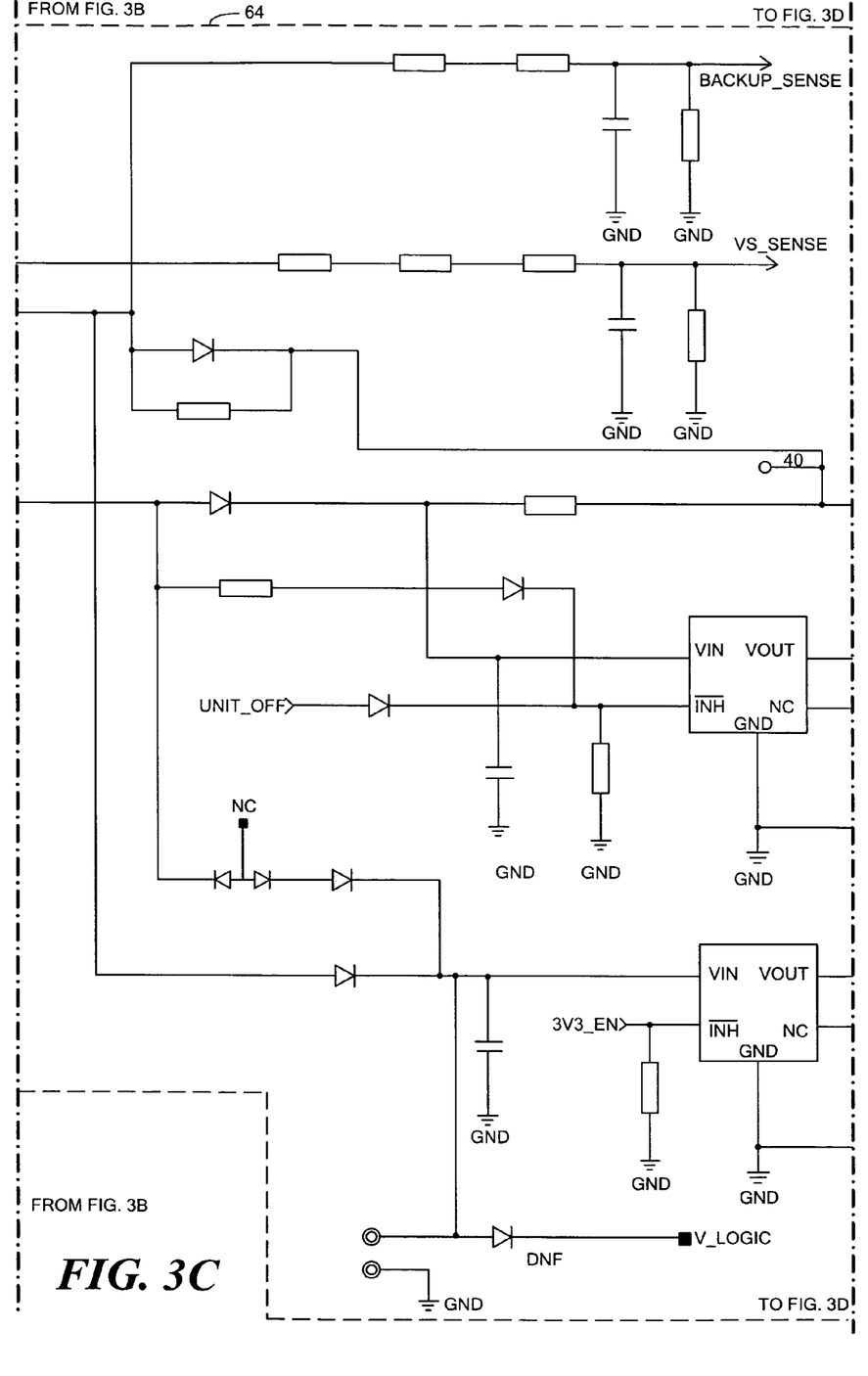
Figure 3D:
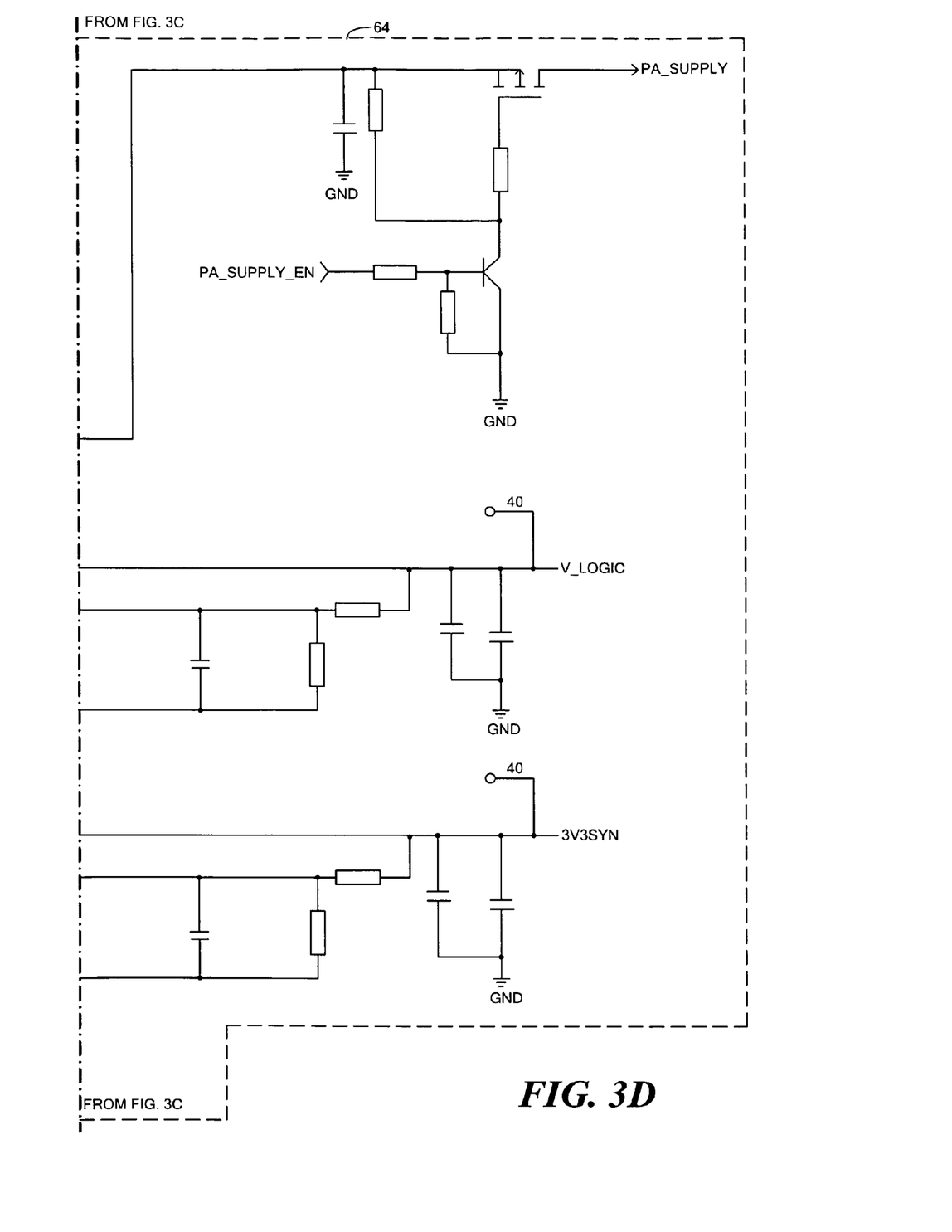

As shown in the example of FIG. 3, the protection circuit is integral with power supply circuit 50 which includes filtering circuit 60 connected to input voltage 62 from the vehicle's battery. First stage voltage regulating circuit 62 regulates the voltage output from filtering circuit 60 and second stage voltage regulating circuit 64 receives the regulated voltage output from first stage voltage regulating circuit 62 and is configured to provide the appropriate voltage levels to transceiver 40, transponder 42, and microcontroller 44.

In accordance with one preferred embodiment, every component of filtering circuit 60, namely capacitors 70, 72, and 74 and inductor 76 are selected to be able to withstand, without damage, an input voltage level much greater than the nominal 12 volt input voltage at 62. In one example, capacitor 70, 72, and 74 and can withstand 200 volts at input 62. The same is true with respect to the components of first stage regulating circuit 62. For example, capacitor 78 thereof can withstand a voltage of 200 volt. Moreover, first stage regulating circuit 62 includes voltage limiting diode 80 which clamps an input voltage as high as 200 volts as filtered by filtering circuit 60 to 12 volts. Thereafter, first stage voltage regulating circuit presents a 9 volt signal to second stage voltage regulating circuit 64 as is known in the art. Thus, other specific components of first stage voltage regulating circuit 62 and the specific components of second stage voltage regulating circuit 64 are not discussed further here.

In any embodiment, if, before law enforcement vehicle 20, FIG. 1 equipped with VTU 22 can locate stolen vehicle 14, a thief attempts to disable VLU 10 of stolen vehicle 14 by injecting a high voltage into VLU 10, protection circuit 52, FIG. 2 clamps the injected voltage at a nominal value allowing the proper operation of transceiver 40, transponder 42, and microcontroller 44. Before the high voltage level is clamped, any circuit components subject to the injected high voltage level are selected such that they can withstand the higher voltage level. In this way, VLU 10 operates correctly even if a thief attempts to disable it.

Specific features of the invention are shown in some drawings and not in others, but this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A vehicle locating unit comprising:
   a receiver for receiving a signal from a network of communication sources;
   a transponder activated when a communication source sends a message to the receiver;

a power supply regulating circuit for regulating a nominal vehicle input voltage and powering said receiver and said transponder; and a protection circuit responsive to an injected input voltage at least an order of magnitude higher than the vehicle input voltage and configured to clamp the injected input voltage at a predetermined maximum voltage the same as or approximately the same as the vehicle input voltage, the protection circuit comprising:

- a filtering circuit with at least one voltage protection device having a breakdown voltage at least as high as the injected input voltage, and
- a voltage regulating circuit including at least one voltage protection device having a breakdown voltage at least as high as the injected input voltage.

2. The vehicle locating unit of claim 1 in which every component of the protection circuit is selected to withstand an injected input voltage greater than said nominal input voltage.

3. The vehicle locating unit of claim 1 in which the protection circuit includes a voltage limiting diode which clamps the injected input voltage at the predetermined maximum voltage.

4. The vehicle locating unit of claim 1 in which the protection circuit is integrated with the power supply regulating circuit.

5. The vehicle locating unit of claim 1 in which the power supply circuit further includes a second stage voltage regulating circuit connected to the first stage voltage regulating circuit and configured to provide the appropriate voltage levels to the receiver and transponder.

* * * * *